(12) United States Patent
Weimper

(10) Patent No.: US 6,904,338 B2
(45) Date of Patent: Jun. 7, 2005

(54) IN-CAR COMPUTING DEVICE AND METHOD OF CONTROLLING A CURSOR FOR AN IN-CAR COMPUTING DEVICE

(75) Inventor: Andreas Weimper, Filderstadt (DE)

(73) Assignee: CAA AG, Filderstadt (DE)

( * ) Notice: Subject to any disclaimer, the term of this patent is extended or adjusted under 35 U.S.C. 154(b) by 171 days.

(21) Appl. No.: 10/158,323

(22) Filed: May 30, 2002

(65) Prior Publication Data

US 2002/0198633 A1 Dec. 26, 2002

(30) Foreign Application Priority Data

May 31, 2001 (DE) .......................................... 101 26 421

(51) Int. Cl.[7] .............................................. G06F 17/00
(52) U.S. Cl. ........................... 701/1; 701/200; 701/201; 701/207; 701/208; 701/211; 340/988; 340/990; 340/995.14; 340/995.17; 340/995.27; 73/178 R
(58) Field of Search ........................... 701/1, 200, 201, 701/207, 208, 211; 73/178 R; 340/988, 990, 995.14, 995.17, 995.27

(56) References Cited

U.S. PATENT DOCUMENTS 5,124,924 A * 6/1992 Fukushima et al. ......... 701/208
6,034,684 A * 3/2000 Proehl et al. ................ 345/764
6,121,900 A * 9/2000 Takishita ................ 340/995.11
6,292,174 B1 * 9/2001 Mallett et al. .............. 345/163
6,487,495 B1 * 11/2002 Gale et al. .................. 701/209

FOREIGN PATENT DOCUMENTS

| DE | 44 00 790 A1 | 5/1995 |
| DE | 198 58 647 A1 | 6/2000 |
| DE | 199 07 620 A1 | 8/2000 |

* cited by examiner

*Primary Examiner*—Thomas G. Black
*Assistant Examiner*—Olga Hernandez
(74) *Attorney, Agent, or Firm*—Harness, Dickey & Pierce, P.L.C.

(57) ABSTRACT

An in-car computing device comprising a computer unit (12), a display screen (20) for displaying information (54–58, 82), a cursor (62) and option menus with individual option menu items, and a control element (22, 23, 24) for moving the cursor on the display screen two-dimensionally and for selecting option menu items. The in-car computing device further comprises a first unit (34) for detecting a display region of predetermined information (54–58, 82) on the display, a second unit (36) for determining a pull-in region (60) of a predetermined size for a display region, and a third unit (30) for applying an operating force to the control element (22) when the cursor (62) is in the pull-in region (60) such that the cursor is moved into the corresponding display region.

12 Claims, 3 Drawing Sheets

IN-CAR COMPUTING DEVICE AND METHOD OF CONTROLLING A CURSOR FOR AN IN-CAR COMPUTING DEVICE

CROSS-REFERENCE TO RELATED APPLICATION

This application claims priority of German patent application DE 101 26 421.6 filed May 31, 2001.

BACKGROUND OF THE INVENTION

The present invention relates to an in-car computing system comprising a computer unit, a display screen for displaying information, a cursor and option menus with individual option menu items, and a control element for moving said cursor on the display screen two-dimensionally and for selecting option menu items. The present invention also relates to a method of controlling a cursor for an in-car computing device comprising a display screen for displaying information, option menu items and a cursor, and a control element for moving said cursor and for selecting an option menu.

In-car computing devices of the afore-mentioned kind are known in the art. More and more, such in-car computing devices are built into modern vehicles. The operation and control of such devices is usually achieved by a central control element, for example in form of a rotary switch button, which allows not only the selection of certain menu items but also the input of data, for example cities and streets, into a navigation system. In addition to an alphanumeric input, there is an alternative possibility with navigation systems to select the destination on a map displayed on a display screen by moving the cursor on the destination. Since the mentioned rotary switch button only allows a movement of the cursor in one direction, the input of the destination has to be carried out in two steps which makes this alternative type of input complicated. More appropriate are control elements which allow a movement of the cursor in two dimensions simultaneously. This kind of control elements, for example, comprises crossed rocker switches, sliding controllers being slidable in x and y directions and a joystick-like control element.

Although the selection of the destination on the map is possible with such control elements, the operation is not very ergonomic due to outer influences within a vehicle. Particularly it is difficult for a user to move the cursor on streets displayed on the screen (only streets are useful destinations).

Similar ergonomic problems also arise with other applications which require a free two-dimensional movement of the cursor for selecting any function. For example, such a function is an Internet function which allows to select randomly distributed hyperlinks by moving the cursor on the respective hyper-link. Such an input into an in-car computing device necessarily requires an eye-hand-coordination in addition, since the user is otherwise not able to recognize whether the desired location on the display screen has been reached by the cursor. Also, this fact may be improved under ergonomic considerations.

Ergonomic aspects relating to standard personal computers have been discussed in DE 199 07 620 A1, DE 198 58 647 A1 or DE 44 00 790 A1, for example.

SUMMARY OF THE INVENTION

In view of the above, the object of the present invention is to provide an in-car computing device which achieves an ergonomically improved operation, which is less demanding with respect to the eye-hand-coordination.

This object is solved by the in-car computing device as mentioned before by providing a first means for detecting a display region of predetermined information on the display screen, second means for determining a pull-in (or attracting) region of a predetermined size for a display region, and third means for applying an operating force to said control element when the cursor is in said pull-in region such that said cursor is moved into the corresponding display region.

Hence, the in-car computing device comprises means which operates or actuates the control element independently of the operation by the user if the cursor is in a predetermined position on the display screen relative to said predetermined information. If the cursor moves into the pull-in region of the display region of a predetermined information by manually operating the control element, or in other words, if the distance between the cursor and the display region falls below a predetermined value, said third means applies a force to said control element as to move the cursor into the display region as long as the user does not apply a larger counter-force. This "attracting" feature or characteristic of the display region and the cursor is comparable with a magnet (the display region in the present case), which magnetically attracts a magnetic material (the cursor in the present case). Here, the pull-in region generated by said second means is comparable with the sphere of activity of a magnet. Is the magnetic material outside the sphere of activity, it is not attracted. The same applies to the cursor which will not be moved into the display region if it is outside the pull-in region. The user of the in-car computing device haptically feels this behavior by moving the control element respectively. The user is in other words able to feel the attracting force of the display region.

The advantage of this in-car computing device is on the one hand side that the operation is considerably simplified due to the simplified positioning of the cursor on a desired information. On the other hand side, the user "feels" the movement of the cursor and its automatic positioning on the display region via the operation of the control element without having to look at the display screen. Therewith, the demands on the hand-eye-coordination are significantly reduced.

Preferably, the information displayed on the display screen are streets, which are required for inputting destinations in a navigation system. In other words, the streets of a navigation map cover particular display regions on the display screen and the second means determines a pull-in region of predetermined size associated to a display region close to the cursor. These pull-in regions are comparable with margin regions of predetermined width extending on the left and right sides of the displayed streets. If the cursor enters such a pull-in region by operating the control element, said third means will apply an operating force to the control element as to move the cursor in the display region. The user is able to feel this force and may recognize without having optical contact to the display screen that the cursor is lying on an object, for example, a street, of the navigation system.

In the same manner, the information displayed on the display screen may also be so-called hyperlinks which are used in an Internet mode of the in-car computing device. Such hyperlinks are part of typical Internet pages which may be displayed on the display screen. According to the invention, a pull-in region is determined for each hyperlink. Is the cursor on a pull-in region, it will automatically be attracted on the hyperlink, wherein a respective operating force is applied to the control element.

Also in this case the input and the selection, respectively, of information is significantly simplified.

Preferably, the control element is a crossed rocker switch (two rocker switches arranged at right angles), a sliding controller or a toggle switch. Generally, the control element has to allow a movement of the cursor in four directions, namely x- and y-directions, so that the cursor may be positioned on any point of the display screen by operating the control element.

In a preferred embodiment of the present invention, upon actuation of the control element in one of said two directions, for moving said cursor, said third means apply an operating force to said control element to move said cursor in the other direction in order to hold said cursor in the display region.

This means that the cursor automatically follows the course of a street if the control element is pushed in one direction by the user. The respective movement in a perpendicular direction thereto is generated by the third means which applies an operating force to the control element.

The advantage of this measure is that the user gets a feeling about the course of the street by the automatic operation of the control element. The user is only able to move the cursor off the street by overcoming the operating force caused by the third means. The result of this measure is a further improvement of ergonomics.

Preferably, the magnitude of the operating force is adjustable and is preferably dependent on the type of the street.

I.e. in other words, said different street types hold the cursor on the desired position with different forces which are transferred by the third means to the control element. The user is therewith able to feel the different magnitudes of the operating forces and as a result may recognize on which street type the cursor actually is. A further improvement of ergonomics of the system is, therefore, achievable.

In a further embodiment of the present invention, the third means applies to said control element a force counteracting the operating force if the cursor reaches the margin of the display screen during the operation of the control element.

I.e. in other words, the third means generates a limit stop which only acts if the cursor reaches the margin of the display screen. Therewith, the user is able to get a feeling about the position of the cursor within the display screen very easily. More preferably, this artificially generated limit stop will start a further function when overpressed (for example scrolling the map detail on the display screen).

The object underlying the present invention is also solved by a method comprising the steps of:

Detecting a display region of a predetermined information on the display screen, detecting a distance between said cursor and an adjacent display region, and automatically applying a force to said control element if the distance to a display region falls below a predetermined value, as to move the cursor onto this display region or to hold the cursor on the display region.

The function underlying this method corresponds to the function already described in connection with the inventive in-car computing device, so that it is refrained from describing the function again.

Preferably, the information displayed on the display screen are streets which are part of a displayed map detail of a navigation system. Preferably, the displayed information may also be hyperlinks of an Internet page.

Most preferably, upon manual actuation of the control element in one of said two directions for moving said cursor, an operating force is generated, moving the cursor in the other direction so that it does not leave the display region.

I.e. in other words, the control element is locked as to avoid that the cursor is moved off the preselected position and hence out of the sphere of activity by wrong operation of the control element.

Most preferably, a force counteracting the manual operating force is applied to said control element, if the cursor reaches the margin of the display screen. Therewith, a limit stop for the control element is provided which may also be overcome by an increased operating force. Overcoming the "artificial" limit stop is, for example, necessary if the map detail or the Internet page displayed on the display screen is to be scrolled or turned over.

Further advantages and embodiments of the present invention can be taken from the following description and the enclosed drawings.

It is to be understood that the features mentioned above and those yet to be explained below can be used not only in the respective combinations indicated but also in other combinations or in isolation without leaving the scope of the present invention.

BRIEF DESCRIPTION OF THE DRAWINGS

An embodiment of the invention is shown in the drawings and will be explained in more detail in the description below with reference to same. In the drawings.

DETAILED DESCRIPTION OF PREFERRED EMBODIMENTS

Figure 1A:
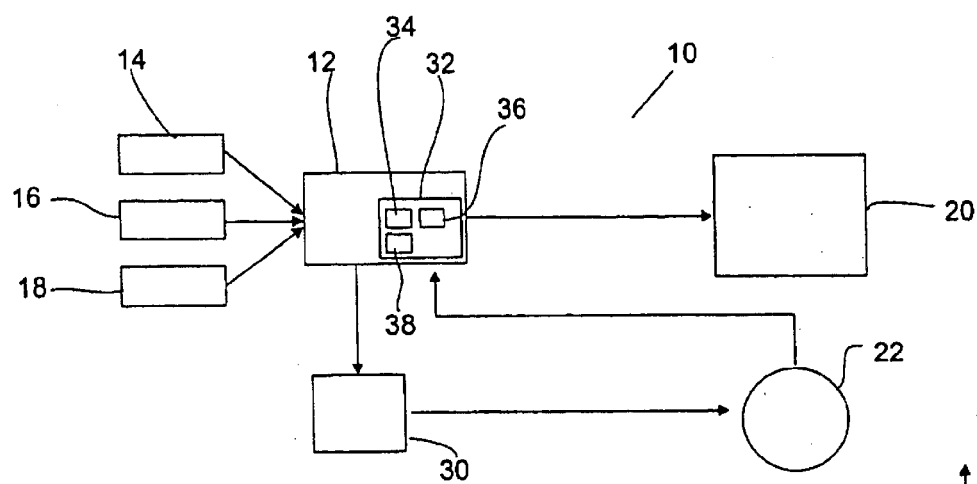
FIG. 1a is a schematic block diagram of an in-car computing device.

In FIG. 1, an in-car computing device is shown as block diagram and is referenced with reference numeral 10. Such an in-car computing device comprises a computer unit 12, which is, for example, a standard personal computer. Typically, the computer unit 12 is, however, adapted to the conditions within a vehicle. The computer unit 12 serves as a control center for a plurality of different peripheral devices, wherein in FIG. 1, for example, a navigation system 14, a telephone system 16, and an Internet communications unit 18 are shown. These peripheral systems are already employed in vehicles presently.

The navigation system 14 comprises a GPS receiver, wheel and steering sensors in case of a coupled navigation, as well as a storage medium which stores navigation data. These navigation data are, for example, courses of streets. The software for calculating the routes and other necessary data runs on the computer unit 12 which on demand receives respective data from the navigation system 14. Nowadays, it is possible to run this calculation on a central server which receives data from the in-car computing device, processes this data and sends the result back to the in-car computing device.

For displaying information as well as option menus, a display screen 20 is provided and located typically in the central dashboard of a vehicle so as to be in the field of view of the driver. The display screen 20 is preferably an LCD-screen and receives signals from the computer unit 12.

For operating the computer unit 12 and hence the peripheral devices 14–18 which are controllable by the computer unit 12, a control element 22 is provided. This control element 22 is provided as a sliding controller (path-dependent controller) in the present embodiment which allows it to be slid freely in x and y directions. Furthermore, the control element 22 can be rotated about the longitudinal axis and pushed in the direction of the longitudinal axis, so that a rotary switch button is realized in addition. In FIG. 1b, this control element 22 is shown schematically, the possible directions of movement being indicated by arrows.

The in-car computing device 10 described before with the mentioned components is offered by the assignee of the present application under the commercial name "CarPC". Moreover, the in-car computing device corresponds to systems which are presently employed in vehicles.

Figure 1B:
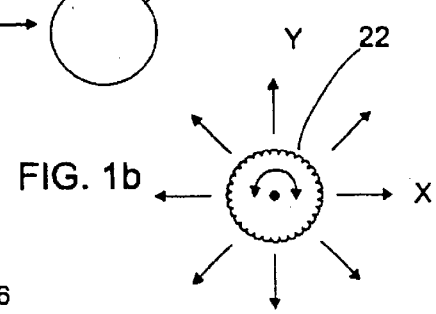
FIG. 1b is a schematic illustration of a control element.

Contrary to the prior approaches, the in-car computing device 10 in FIG. 1a comprises a force feedback unit and a force-applying unit 30, respectively. This unit 30 receives control data from the computer unit 12 and serves to apply an operating force to the control element 22 in response to these data. The force is, for example, generated by electrically operated actuators which are coupled mechanically with the control element 22. The force-applying unit 30 is configured such that a force acting in the directions indicated by arrows in FIG. 1b can be applied. With this force-applying unit 30, different functions may be realized, for example it is conceivable to implement an index known from mechanical control elements. Moreover, the unit 30 also can be configured to prevent any movement of the control element 22 in particular directions.

The computer unit 12 comprises a respective control unit 32 for controlling the force-applying unit 30, the function of this control unit 32 being described with reference to FIGS. 2 and 3a, 3b, in connection with the navigation system 14.

Figure 2:
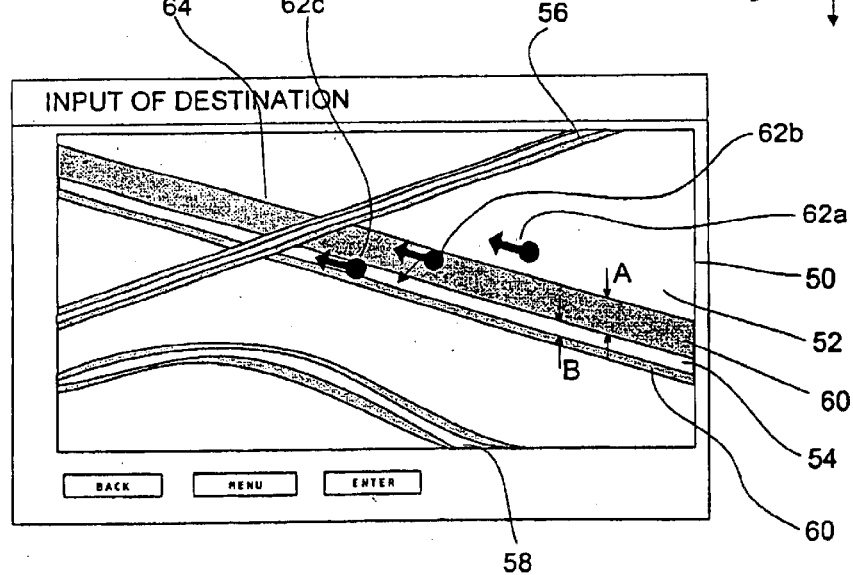
FIG. 2 is a schematic diagram of a screen mask for illustrating the method according to the present invention.

It is known that car navigation systems serve to show the driver the route to a destination which the user has input before. Normally, the selection of the destination is made by inputting alphanumeric characters. However, it is also possible to seek the destination on a map detail displayed on the display screen 20 and to select the desired destination by moving the cursor thereon. The control unit 32 supports the user with this selection as follows:

In FIG. 2, a screen mask 50 is shown which serves to select a destination. In the displayed map detail 52, a plurality of streets 54, 56, and 58 are illustrated.

The control unit 32 comprises means 34 which detects the position of the streets 54-58 on the display screen. Means 34 determines a display region on the display screen which is covered by the streets 54-58. on the basis of this calculated display region and display regions, respectively, a unit 32 determines a margin region 60 (also called pull-in region) for each display region and to each street, respectively, on the left and right side of the respective street. These margin regions 60 are shown in FIG. 2 in gray color. The width of these margin regions may be preset by the user, wherein in the present embodiment different widths are selected and indicated with A and B. As an alternative, it is also conceivable that the width of the margin regions is selected dependent on the type of the street; for example, a large width for highways and a small width for city streets, or vice versa.

It is to be noted that the margin regions 60 displayed in FIG. 2 are shown only for illustration purposes. In the normal operation mode of the navigation system, these margin regions are calculated but not displayed on the display screen 20. Moreover, it is to be noted that it is not necessary to calculate the margin regions for all streets displayed on the display screen. Rather this serves for better understanding of the functioning of the present invention. It is sufficient to determine and calculate the margin regions for the streets directly adjacent to the cursor. In other words, the distance between the cursor and the adjacent streets is calculated.

The control unit 32 further comprises a unit 38 which serves to calculate the position of the cursor on the display screen. In FIG. 2, several cursors 62a, 62b and 62c are shown for illustrating the function of the control unit 32.

The function of the control unit 32 is to check whether the cursor 62 is on a street 54–58 or in a margin region 60, first. If this is not the case, as for example for cursor 62a, this check is not followed by further actions.

If the user moves the cursor 62a in the margin region 60 of the street 54 by a respective operation of the control element 22, as for example shown by cursor 62b, the check carried out by the control unit 32 yields the result that the cursor 62b is in the margin region 60, i.e. the distance between the cursor and the street is below a predetermined distance A. The result is that the computer unit 12 supplies a control signal to the force-applying unit 30, which actuates the control element 22 by use of respective electric actuators and independently of the user, i.e. automatically, so that the cursor 62 is moved on the street 54, what is shown by cursor 62c. It is to be understood that the afore-mentioned check of the cursor position and the comparison with the position of the margin region 60 is carried out continuously also during the actuation of the control element 22.

The margin region 60, therefore, acts like a magnetic field which traps the cursor 62 and attracts the cursor on the street 54.

The advantage of the control described before is particularly that the user feels by way of the automatic actuation or operation of the control element 22 caused by the force-applying unit 30 that the cursor 62 is automatically attracted on the street. Hence, the user has not to look at the display screen 20.

In FIG. 2, a region 64 is shown in which both streets 54 and 56 intersect. Hence, the respective margin regions 60 intersect as well. The control unit 32 recognizes such an intersection and will move the cursor 62 on the street having the highest priority. The priority may be preset by the user or may be automatically generated, for example, dependent on the street type. It would be conceivable to assign the highest priority to the biggest streets (for example highways) and to assign the least priority to the least streets. In case that two streets having the same priority intersect, the decision on which street the cursor is attracted may be made randomly. A preferred solution, however, is to attract or move the cursor 62 on the intersection of both streets, where the user has then the possibility to move the cursor further on the desired street. Here, the afore-mentioned priority rule may be applied in the way that the actuation of the control element is easier in the direction of the street with the higher priority than in other directions.

In this case (cursor on an intersection), upon actuating the control element the user has the impression as if the control element would be guided by a gate (like a shifting gate of a transmission).

By means of the control unit 32 and the force-applying unit 30, it is hence possible to move the cursor to the desired destination very ergonomically. The user is supported insofar as the cursor has not to be moved exactly on, for example, the desired destination street. Rather, this will be made by the system when the calculated distance to the street falls below the predetermined value. Additionally, the driver (user) receives a feedback from the force-applying unit 30 and the control element 22, so that he is not urged to look at the display screen. Since the "magnetic effect" of the streets on the display screen does not cease when the cursor is on a street, the system also operates in the aforementioned manner if the user moves the cursor off the street inadvertently.

If the user, however, wants to move the cursor off the street to another street, he has merely to overcome the force caused by the force-applying unit 30, which is of course limited in terms of magnitude.

With respect to FIGS. 3a and 3b, a further function of the control unit 32 in combination with the force-applying unit 30 is described below.

Figure 3A:
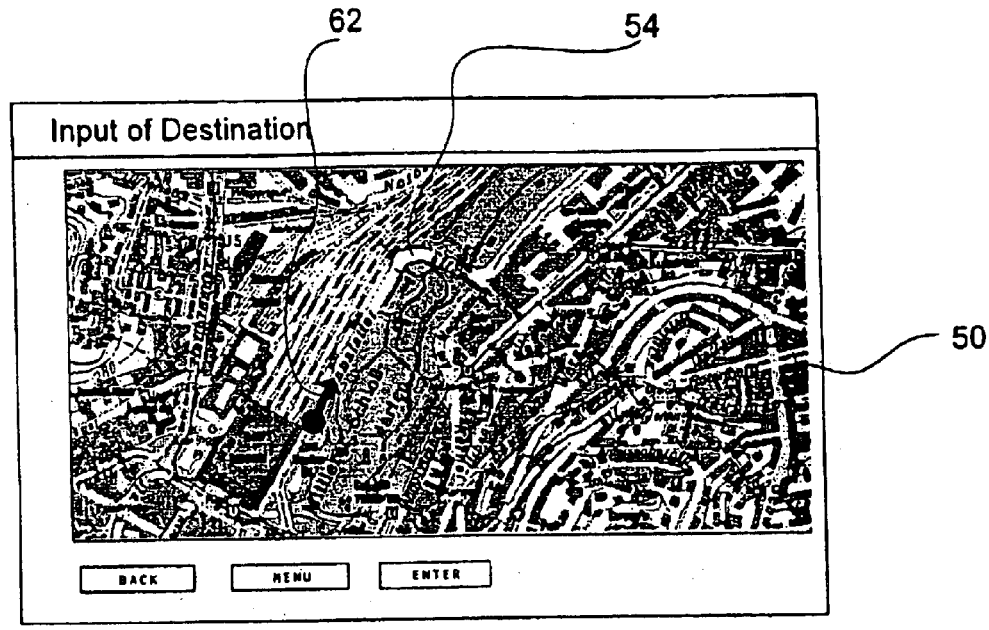
FIGS. 3a and 3b are two different screen masks of a navigation system.

In FIG. 3a, a map detail is shown as screen mask 50 for inputting a destination. The cursor 62 is on the street 54 drawn in FIG. 3a. If the user wants to move the cursor 62 on this street, it is only necessary to push the control element 22 in y direction (see FIG. 1b). If the cursor moves into the margin region—not shown—due to the transverse course of the street 54, the force-applying unit 30 immediately applies an operating force to the control element 22 in x direction, 50 that the cursor is moved back on the street. Hence the cursor follows the course of the street although the user operates the control element only in one direction. The user gets a feeling about the course of the street 54 by means of the control element 22. Only if the user overpresses the operating force caused by the force-applying unit 30, the cursor 62 leaves the street 54.

If the cursor 62 reaches the margin of the display screen 50 by the user's operation of the control element 22, the force-applying unit 30 generates a force which simulates a limit stop. If the user overcomes this force, the map detail will be replaced by a respective neighboring map detail. Of course, other changes of the map detail, for example slowly scrolling, etc. are conceivable.

If the map detail is changed, it is necessary to re-adapt the position of the control element 22. Otherwise, particular screen regions would not be reachable any more. As to achieve a respective re-adaption, the force-applying unit 30 is activated. The unit applies to the control element a force, urging the control element into a position which corresponds to the cursor position on the screen. This process may be carried out fast and with a relative high force so that the user feels this adaption. Of course, this process may also be carried out slowly and hence hardly noticeable for the user.

Figure 3B:
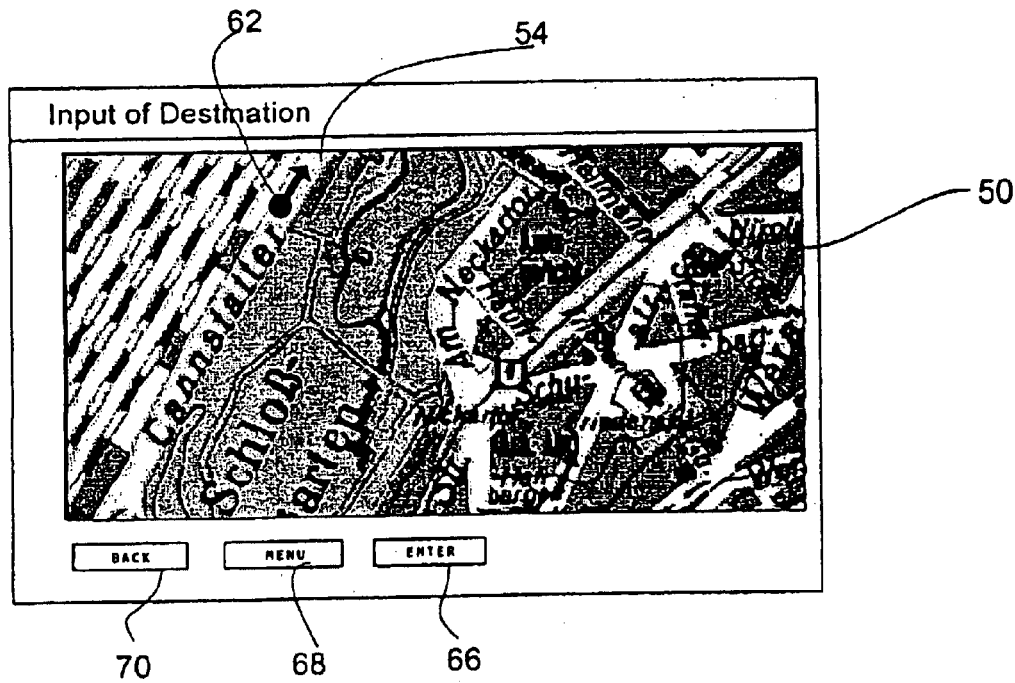

If the user likes to enlarge the map detail shown in FIG. 3, he may, for example, rotate the control element 22. A map detail on an enlarged scale is shown in FIG. 3b.

If the user has found the desired destination on the map detail, he can then input this destination by activating the menu item "Enter" 66 as shown in FIG. 3b into the navigation system. Moreover, further menu items 68 and 70, respectively, may be selected which, however, are not described in detail here. It is to be understood that also other option menu items or additional menu items may be displayed on the display screen 20.

In the afore-mentioned embodiment, the streets shown in a map detail, form the "magnetic" regions, which have influence on the control of the force-applying unit 30. However, it is apparent for a person skilled in the art that any other information could also have this magnetic effect. For example, in FIGS. 4a and 4b it is shown that also so-called hyperlinks of an Internet page may have such magnetic effect.

Figure 4A:
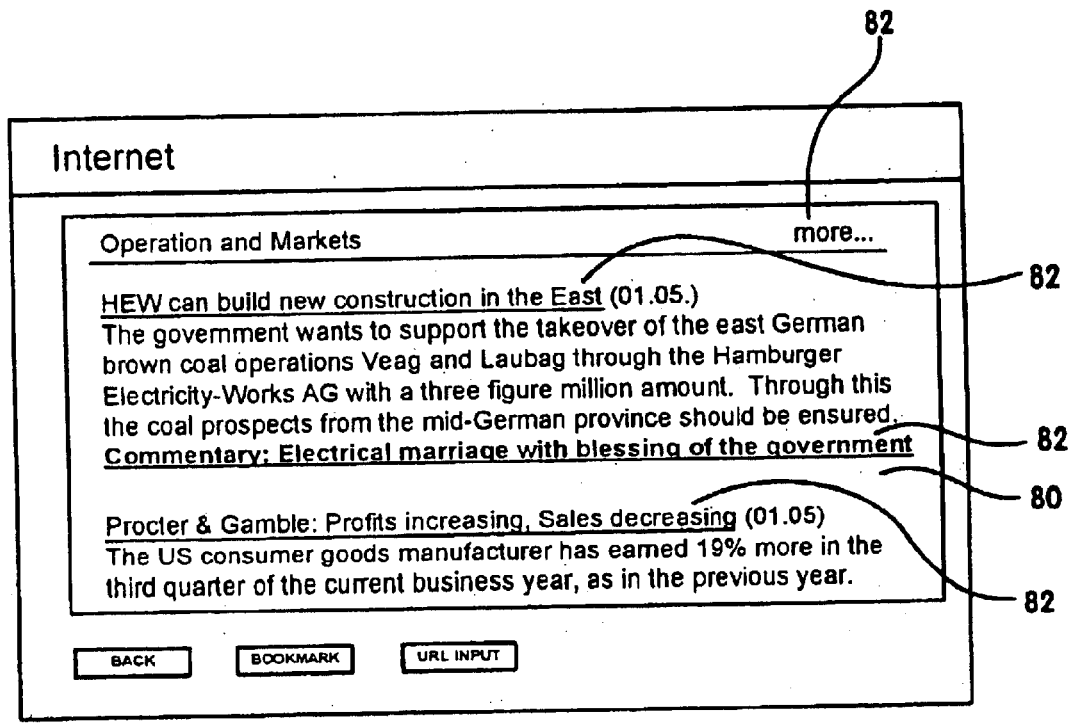
FIGS. 4a and 4b are schematic diagrams of an Internet page, pull-in regions being shown in FIG. 4b for explaining the method according to the present invention.

In FIG. 4a, an Internet page 80 is illustrated which is displayed on the display screen 20 after activating the Internet communication unit 18. Such an Internet page 80 comprises typically one or a plurality of hyperlinks which are indicated by an underline in FIGS. 4a and 4b, and which are referenced by reference numeral 82.

Such hyperlinks 82 allow the user to reach other related Internet pages by moving the cursor 62 on the hyperlink 82 and activating it.

Figure 4B:
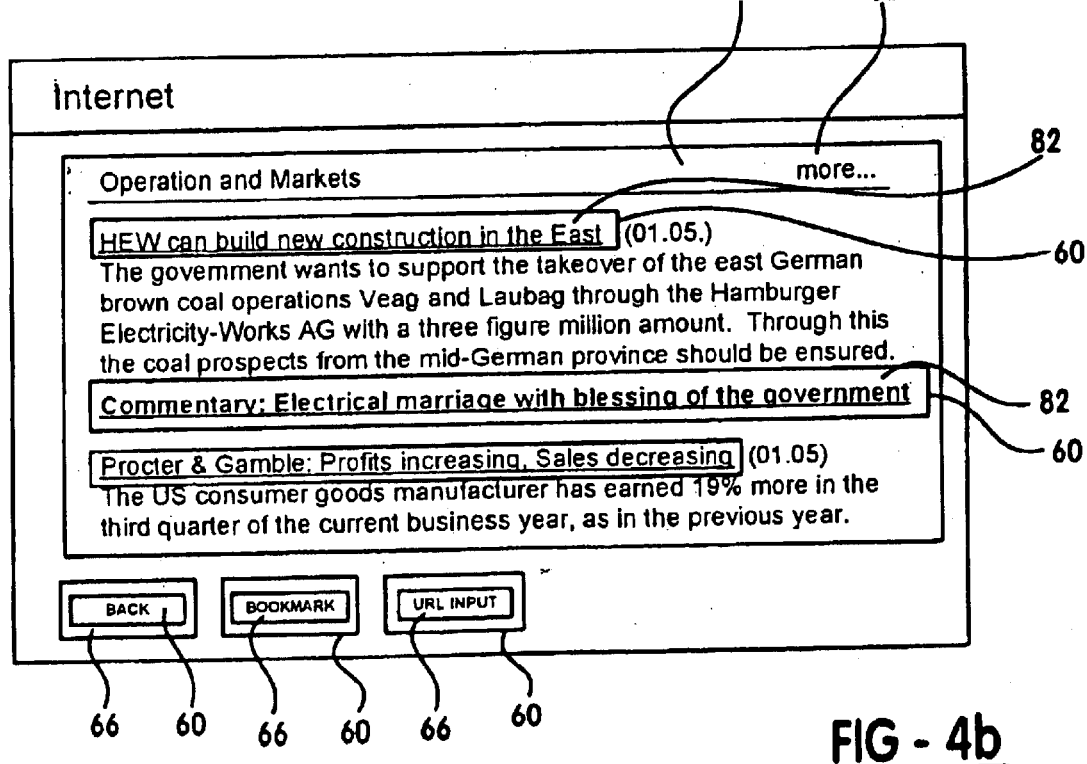

Also in this case the control unit 32 detects the screen position of the hyperlink 82 and determines a margin region 60 around the display region of the hyperlink. The margin region 60 is shown in FIG. 4b in gray color. If the cursor is moved in the margin region 60, the force-applying unit 30 is activated in response thereto with the result that the electric actuators operate the control element 22 such that the cursor is automatically moved on the hyperlink. By pushing the control element 22, the user may then activate this hyperlink.

The advantages of this control are similar to that already described in connection with the navigation system so that it is referred to the respective description above. However, one main advantage is that moving the cursor on hyperlinks is simplified for the user and that the user receives a feedback thereof by means of the automatic operation of the control element 22.

Similar to the afore-mentioned embodiment, the Internet page displayed on the screen is scrolled or turned over by moving the cursor to the margin of the screen and by overpressing the counteracting force (for simulating a limit stop) generated by the force-applying unit 30.

In addition to the hyperlinks 82 shown in FIG. 4b, also menu items 66 displayed on the screen margin may have a magnetic effect so that the control unit 32 also determines a margin region 60.

Furthermore, the control unit 32 in combination with the force-applying unit 30 make sure that the user has to apply an increased operating force as to move the cursor off a hyperlink 82. This ensures that the user is able to select a hyperlink 82 also during vibrations in the vehicle.

In view of the above, it is apparent that the functions provided by the control unit 32 and the force-applying unit 30 may be applied not only to streets of a navigation system but also to any other information, for example hyperlinks of an Internet page. The in-car computing device 10 may be configured such that the user is allowed to preselect the kind of displayed information which the magnetic effect is to be assigned to.

What is claimed is:

1. Method of controlling a cursor for an in-car computing device comprising a display screen for displaying information, option menu items and a cursor, and a control element for moving said cursor and for selecting an option menu items, the method comprising the steps:

detecting a display region of a predetermined information on the display screen, detecting a distance between said cursor and an adjacent display region, and automatically applying a force to said control element if the distance to a display region falls below a predetermined value so as to move the cursor on this display region.

2. Method of claim 1, characterized in that said information displayed on said display screen are streets which are part of a map detail of a navigation system.

3. Method of claim 1, characterized in that said information displayed on the display screen are hyperlinks of an Internet page.

4. Method of claim 2, characterized in that upon manual actuation of the control element in one of said two directions (x-, y-direction) for moving said cursor, said third means applies an operating force to said control element to move said cursor in the other direction in order to hold said cursor on the display region.

5. Method of any of claims 2, characterized in that a force counteracting the manual operating force is applied to said control element if the cursor reaches the margin of the display screen.

6. Method of claim 5, characterized in that said map detail displayed on the display screen is changed if the counteracting force is overcome by the user.

7. Method of claim 2, characterized in that the magnitude of the force depends on the street type.

8. Method of claim 2, characterized in that the internet page displayed on the display screen is turned over if the counteracting force is overcome by the user.

9. Method of claim 3, characterized in that said information displayed on the display screen are option menu items.

10. Method of controlling a cursor for an in-car computing device comprising a display screen for displaying a map with streets, option menu items and a cursor, and a control element for moving said cursor and for selecting an option menu item, the method comprising the steps:

detecting a display region of a street on the display screen, detecting a distance between said cursor and an adjacent display region, and automatically applying a force to said control element if the distance to a display region falls below a predetermined value so as to move the cursor on this display region, wherein upon manual actuation of the control element in one of said two directions (x-, y-direction) for moving said cursor, said third means applies an operating force to said control element to move said cursor in the other direction in order to hold said cursor on the display region.

11. In-Car computing device comprising a computer unit, a display screen for displaying information, a cursor and option menus with individual option menu items, said information displayed on the display being streets, a control element for moving said cursor on the display screen two-dimensionally and for selection option menu items, first means for detecting a display region of predetermined information on the display, second means for determining a pull-in region of a predetermined size for a display region, and third means for applying an operating force to said control element when the cursor is in said pull-in region such that said cursor is moved into the corresponding display region, wherein upon actuation of the control element in one of said two directions (x-, y-direction) for moving said cursor, said third means applies an operating force to said control element to move said cursor in the other direction in order to hold said cursor on the display region, the magnitude of said operating force depending on the street-type.

12. In-Car computing device comprising a computer unit, a display screen for displaying information, a cursor and option menus with individual option menu items, said information displayed on the display being hyperlinks, a control element for moving said cursor on the display screen two-dimensionally and for selecting option menu items, first means for detecting a display region of predetermined information on the display, second means for determining a pull-in region of a predetermined size for a display region, and third means for applying an operating force to said control element when the cursor is in said pull-in region such that said cursor is moved into the corresponding display region, wherein said third means applies to said control element a force counteracting said operating force, when said cursor reaches the margin of the display screen during operation.

* * * * *

UNITED STATES PATENT AND TRADEMARK OFFICE
CERTIFICATE OF CORRECTION

PATENT NO. : 6,904,338 B2
DATED : June 7, 2005
INVENTOR(S) : Andreas Weimper

It is certified that error appears in the above-identified patent and that said Letters Patent is hereby corrected as shown below:

<u>Column 8,</u>
Line 59, "items" should be -- item --.

<u>Column 9,</u>
Line 13, "any of claims" should be -- claim --.
Line 23, "claim 2" should be -- claim 3 --; and "internet" should be -- Internet --.

Signed and Sealed this

Sixth Day of September, 2005

JON W. DUDAS
*Director of the United States Patent and Trademark Office*